(12) United States Patent  
Smith

(10) Patent No.: US 6,885,742 B1  
(45) Date of Patent: Apr. 26, 2005

(54) SYSTEM AND METHOD FOR INTEGRATING CALL DELIVERY FOR FIXED-SITE AND MOBILITY SERVICES

(75) Inventor: Erik L Smith, Seattle, WA (US)

(73) Assignee: Cingular Wireless II, Inc., Redmond, WA (US)

( * ) Notice: Subject to any disclaimer, the term of this patent is extended or adjusted under 35 U.S.C. 154(b) by 0 days.

(21) Appl. No.: 09/474,138

(22) Filed: Dec. 29, 1999

Related U.S. Application Data

(60) Provisional application No. 60/114,102, filed on Dec. 29, 1998.

(51) Int. Cl.[7] .................................................. H04M 3/42
(52) U.S. Cl. .............................. 379/211.01; 379/211.02
(58) Field of Search ...................... 379/211.01, 211.02, 379/207.04, 207.05

(56) References Cited

U.S. PATENT DOCUMENTS

| | | | | |
|---|---|---|---|---|
| 5,206,901 A | * | 4/1993 | Harlow et al. ......... 379/207.07 |
| 5,351,235 A | | 9/1994 | Lahtinen .................... 370/259 |
| 5,487,111 A | * | 1/1996 | Slusky .................. 379/211.03 |
| 5,706,339 A | * | 1/1998 | Eisdorfer et al. ...... 379/210.02 |
| 5,963,864 A | * | 10/1999 | O'Neil et al. ............... 455/445 |
| 5,978,672 A | * | 11/1999 | Hartmaier et al. .......... 455/413 |
| 6,028,917 A | * | 2/2000 | Creamer et al. ....... 379/100.01 |
| 6,301,474 B1 | * | 10/2001 | Hartmaier et al. .......... 455/417 |

\* cited by examiner

*Primary Examiner*—Ahmad F. Matar  
*Assistant Examiner*—Quynh H. Nguyen  
(74) *Attorney, Agent, or Firm*—Kenyon & Kenyon

(57) ABSTRACT

A system and method for call forwarding between a subscriber's fixed-site and mobility devices. An incoming call is received that is directed to a fixed-site device belonging to the subscriber. When a busy/no-answer condition is detected at the fixed-site device, a subscriber profile is consulted, and the call is forwarded to the subscriber's mobility device in accordance with the profile. A similar procedure is followed for an incoming call to a mobility device, which can be forwarded to the subscriber's fixed-site device.

5 Claims, 7 Drawing Sheets

*Unanswered Call to Residence*

*Unanswered Call to Mobility Device*

*Unanswered Call to Residence*

*Unanswered Call to Mobility Device*

*Unanswered Call to Residence*
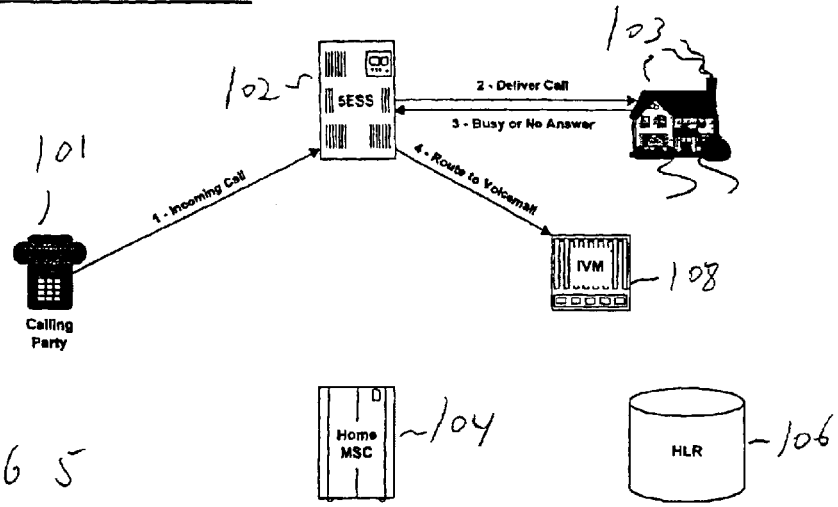
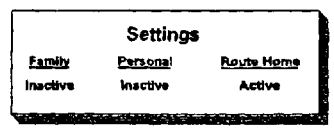
FIG 5
*Unanswered Call to Mobility Device*
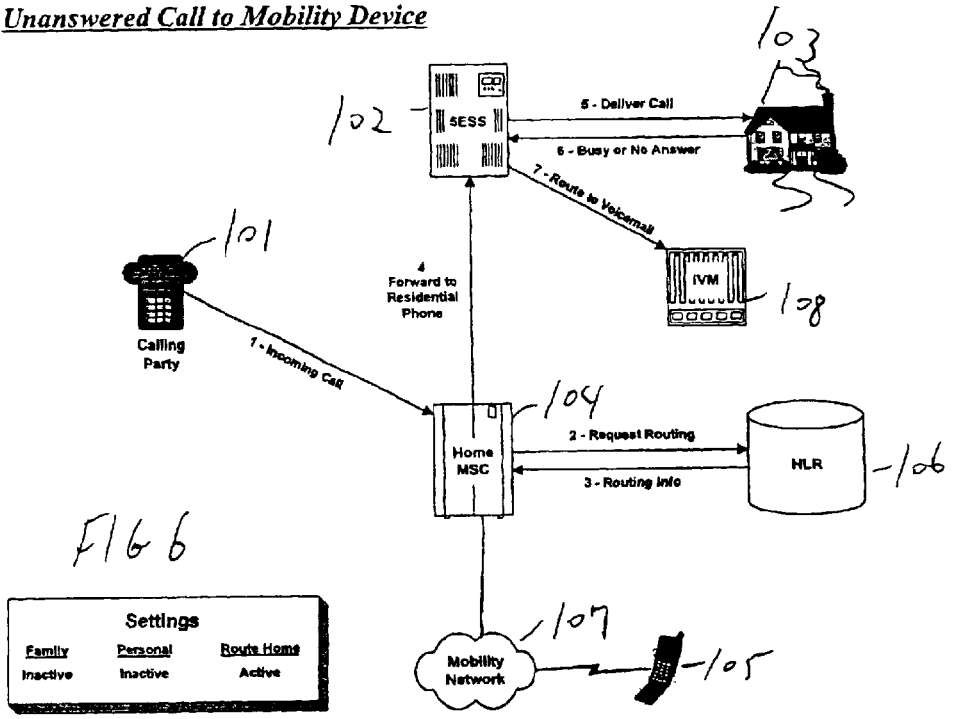
FIG 6
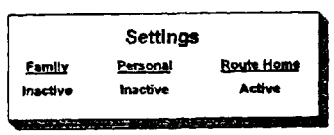

*Unanswered Call to Residence*

*Unanswered Call to Mobility Device*

*Unanswered Call to Residence*

*Unanswered Call to Mobility Device*

HLR Only Update From Mobility Device Feature Code

HLR Only Update From Web Browser Interface

SYSTEM AND METHOD FOR INTEGRATING CALL DELIVERY FOR FIXED-SITE AND MOBILITY SERVICES

CROSS-REFERENCE TO RELATED APPLICATIONS

This application claims the benefit of U.S. provisional application No. 60/114,102, filed Dec. 29, 1998.

BACKGROUND OF THE INVENTION

Known systems provide little linkage between a telecommunications services subscriber's fixed residential and mobility services, besides known standard call forwarding that is typically implemented independently by the subscriber. Known systems disadvantageously do not permit the subscriber to control the types of calls that can reach her, and on which device, as the subscriber moves among different environments (e.g., residential, office, mobile, etc.) and activities.

Standard call forwarding is a known system typically implemented by the subscriber that specifies a forwarding destination for an incoming call to an alternative number when the incoming call encounters a busy/no-answer condition at the called number. Known standard call forwarding must be implemented by the subscriber at each individual device location, and can be difficult to turn on and off remotely. It can be difficult for a subscriber to specify conditions under which a call is to be forwarded from one device to another, besides the busy/no-answer condition. Known standard call forwarding systems do not offer the user an integrated environment for forwarding incoming calls to more than one telephone number owned by the subscriber, and do not easily implement call forwarding between the subscriber's fixed (e.g., residential) and mobility services.

One known system is a "single-number" service, also known as the "follow-me" service. In accordance with this known system, the subscriber is assigned a single number which any calling party ("caller") can dial to reach the subscriber. The subscriber creates and activates specific "filters," i.e., routing plans, that deliver incoming calls to the subscribers assigned single number to the device the subscriber specifies in the activated filter. Thus, for example, a subscriber can specify that calls to the single number made during business hours be routed to her business telephone, and calls to the single number made after business hours be routed to her residential telephone. This known system disadvantageously does not permit the subscriber to continue to use her existing telephone numbers (e.g., her residential numbers, office numbers, mobility numbers, etc.) The use of a single, unified telephone number eliminates useful context information about an incoming call. For example, with distinct office, residential and mobility numbers, incoming calls to the office number typically pertain to business matters; calls to the residential number generally pertain to personal matters; and calls to the mobility number are often of an urgent nature. This information, which can be useful to the subscriber in deciding how an incoming call is to be routed, is disadvantageously lost in known single-number systems.

SUMMARY OF THE INVENTION

An embodiment of the present invention advantageously provides call forwarding between a fixed-site telecommunications device, such as subscriber's residential telephone, and a mobility device, such as the subscriber's mobile telephone. When a call is received by a switch associated with the fixed-site device, the switch attempts to deliver the call to the fixed-site device. If a busy/no-answer condition is detected at the fixed-site device, the call is advantageously forwarded to a Mobile Switching Center associated with the subscriber's mobility device. The Mobile Switching Center consults a Home Location Register, which stores a subscriber profile. The Home Location Register consults the subscriber profile, and returns routing information based upon the profile to the Mobile Switching Center. The Mobile Switching Center advantageously routes the call directly to voicemail if the subscriber has activated a "do-not-disturb" feature in accordance with an embodiment of the present invention. Otherwise, the call is forwarded to the mobility device through the mobility network. If the mobility network indicates to the Mobile Switching Center that a busy/no-answer condition exists at the subscriber's mobility device, then the Mobile Switching Center can advantageously forward the call to voicemail.

Likewise, when an incoming call is received for the subscriber's mobility device at a Mobile Switching Center, the Mobile Switching Center sends a request for routing information to a Home Location Register that stores a profile of the subscriber. The Home Location Register returns routing information for the call to the Mobile Switching Center, based upon the subscriber's profile. The Mobile Switching Center can attempt to deliver the call to the subscriber's mobility device, and if a busy/no-answer condition is detected, forward the call to a switch associated with the subscriber's fixed-site telephone, or else forward the call to voicemail. If the call is forwarded to the switch, the switch can attempt to deliver the call to the subscriber's fixed-site device. If the fixed-site device is busy, or does not answer, the call can be forwarded to voicemail.

The subscriber's profile and other forwarding information can advantageously be easily configured by the subscriber using a PC and a web-type graphical user interface in one embodiment. In another embodiment, the subscriber uses a touch pad on a fixed-site device (e.g., telephone) or mobility device (telephone, networked personal digital assistant, etc.) to change her profile settings.

An embodiment of the present invention advantageously integrates call delivery for a subscriber between her fixed-site and mobile telecommunications devices.

BRIEF DESCRIPTION OF THE DRAWINGS

FIG. 5 shows a system handling an unanswered call to a residence in accordance with yet another embodiment of the present invention.

FIG. 6 shows a system handling an unanswered call to a mobility device in accordance with yet another embodiment of the present invention.

DETAILED DESCRIPTION

An embodiment of the present invention advantageously "untethers" a subscriber's telecommunications service by integrating call delivery between a subscriber's fixed (e.g., residential, office) and mobility services, while advantageously permitting the fixed and mobility devices to retain their individual identities. In accordance with the present invention, a caller can reliably and efficiently reach the subscriber regardless of the number dialed by the caller.

In one embodiment of the present invention, there are three settings for call routing: the family setting; the personal setting; and the route-home setting. When active, the family setting allows calls that encounter a busy/no-answer condition at the subscriber's residential Directory Number ("DN," device (e.g., telephone) number) to forward to the subscriber's mobility device. In this example, the fixed-site device is the subscriber's residential telephone. Generally, a fixed-site device is any telecommunications device besides a mobile telecommunications device. Other examples of a fixed-site device include an office telephone, a pay phone, guest telephone, a hotel telephone, etc.

If the call is unanswered at the mobility device, then the call is forwarded to Integrated Voice Mail ("IVM"). IVM is a voicemail service provided by the telecommunications service provider. If the family setting is inactive, then calls that encounter a busy/no-answer condition at the residential DN will forward directly to IVM.

When the personal setting is activated, calls the DN of the mobility device are allowed. In most cases, the DN of the mobility device will be the same as the Mobile Identification Number ("MIN") of the mobility device, as known in the art. When the personal setting is inactive, a "do not disturb" condition is implemented for the mobility device, and all incoming calls to the mobility device will be routed directly to IVM. This advantageously prevents undesired mobility fees from accruing to the subscriber from unwanted incoming mobility calls.

The route-home setting allows calls to the mobility device to be forwarded to the subscriber's residential DN when either: 1) a busy/no-answer condition is encountered at the subscriber's mobility device; or 2) the mobility device is inactive, or not registered. If the call is forwarded to the subscriber's residential DN and not answered, then the call is forwarded to IVM. If the route-home setting is inactive, calls to the mobility device are forwarded directly to IVM either when: 1) a busy/no-answer condition is encountered at the subscriber's mobility device; or 2) the mobility device is inactive or not registered.

The family and route-home settings are mutually exclusive in this embodiment; and only one of the settings can be active at the same time.

Figure 1:
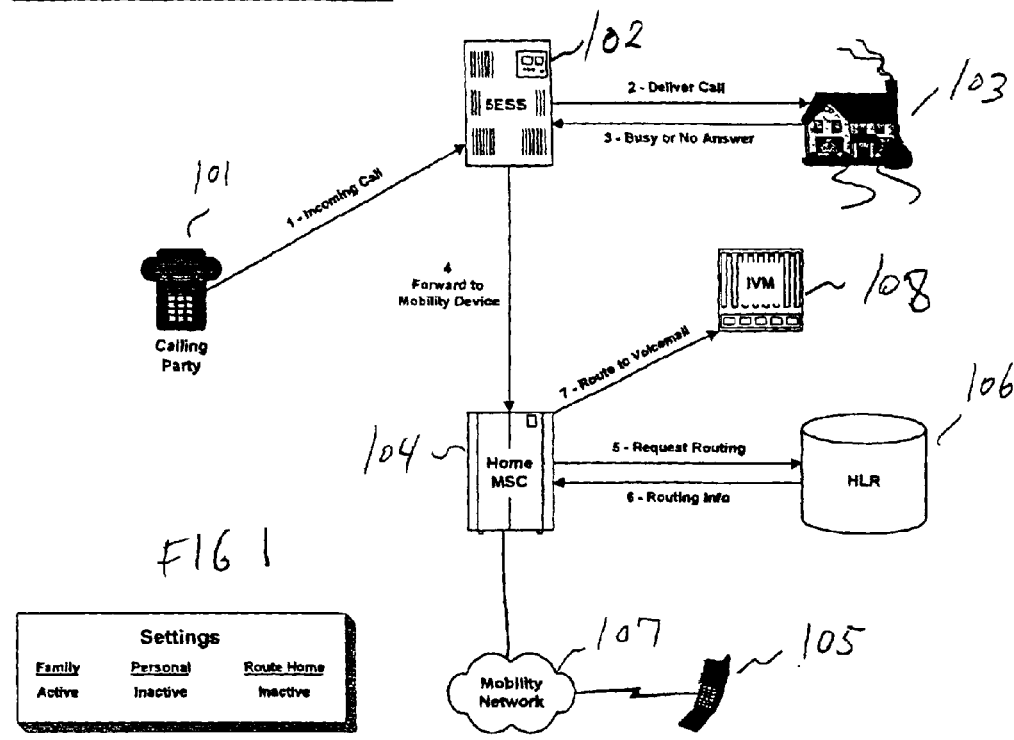
FIG. 1 shows a system handling an unanswered call to a residence in accordance with an embodiment of the present invention.

In accordance with an embodiment of the present invention shown in FIG. 1, a calling party 101 is adapted to be coupled to the Public Switched Telephone Network, and in particular to a Class 5 102 switch associated with a telephone 103 at the subscriber's residence. An example of a Class 5 switch is a 5ESS switch manufactured by the Lucent Technologies Incorporated. The calling party 101 is also adapted to be coupled to a Mobile Switching Center ("MSC") 104 associated with the DN of the subscriber's mobility device 105. The MSC 104 is coupled to a Home Location Register ("HLR") 106 as known in the art. The subscriber's residential telephone 103 is adapted to be coupled to the Class 5 Switch 102, and the subscriber's mobility device 105 is adapted to be coupled to the MSC 104 through mobility network 107. Both the subscriber's residential telephone 103 and her mobility device 105 are adapted to be coupled to IVM 108. The HLR 106 includes a database that can include an indication for determining if a user has subscribed to a service in accordance with an embodiment of the present invention; a mapping between a residential directory number and a mobile directory number; and the values of the family, personal and route-home settings for a subscriber.

As shown in FIG. 1, the family setting is active, while the personal and route-home settings are inactive. An incoming call to the subscriber's residential DN is delivered by the PSTN to the Class 5 switch 102. The Class 5 switch 102 attempts to deliver the incoming call to the subscriber's residential telephone 103, at which there is a busy/no-answer condition. Because the family setting is active, the incoming call is forwarded to the to the MSC 104 associated with the DN of the subscriber's mobility device 105. The MSC 104 requests routing information from the HLR 106. The personal setting in the subscriber's HLR profile is inactive, so the HLR 106 returns instructions to the MSC 104 to route the incoming call to IVM 108. The incoming call is then routed to IVM 108.

Figure 2:
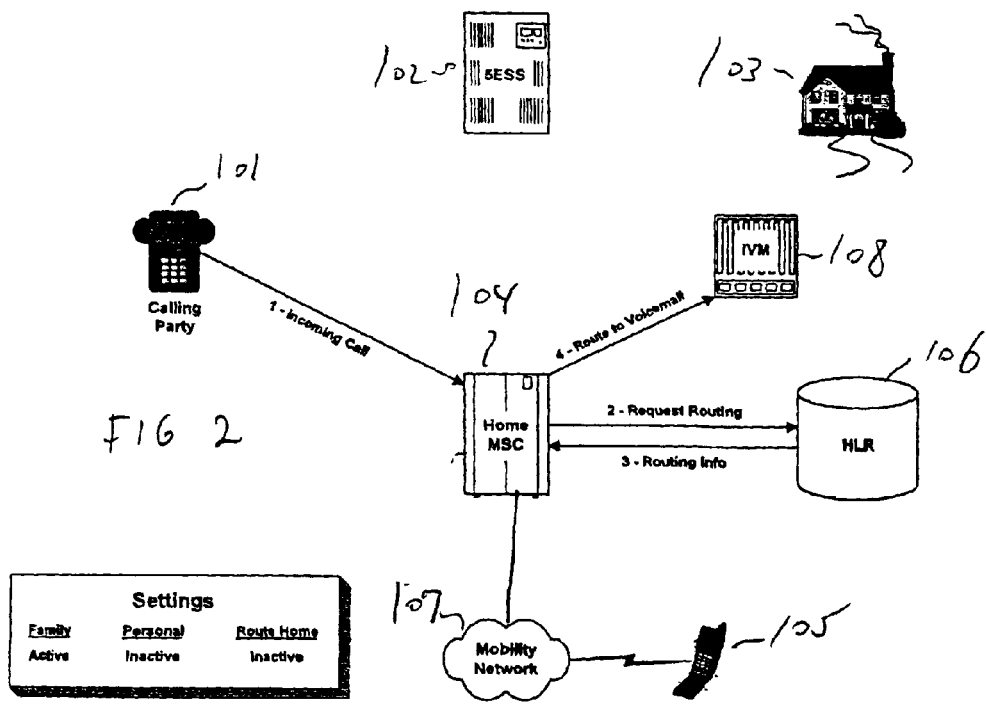
FIG. 2 shows a system handling an unanswered call to a mobility device in accordance with an embodiment of the present invention.

FIG. 2 shows the same system with the same settings as in FIG. 1, handling an unanswered call to the subscriber's mobility device 105. An incoming call for the DN of the mobility device 105 is delivered by the PSTN to the MSC 107. The MSC 107 requests call routing information from the HLR 106. Since the personal setting in the subscriber's HLR profile is inactive, the HLR returns instructions to route the incoming call to IVM 108. The incoming call is routed to IVM 108.

Figure 3:
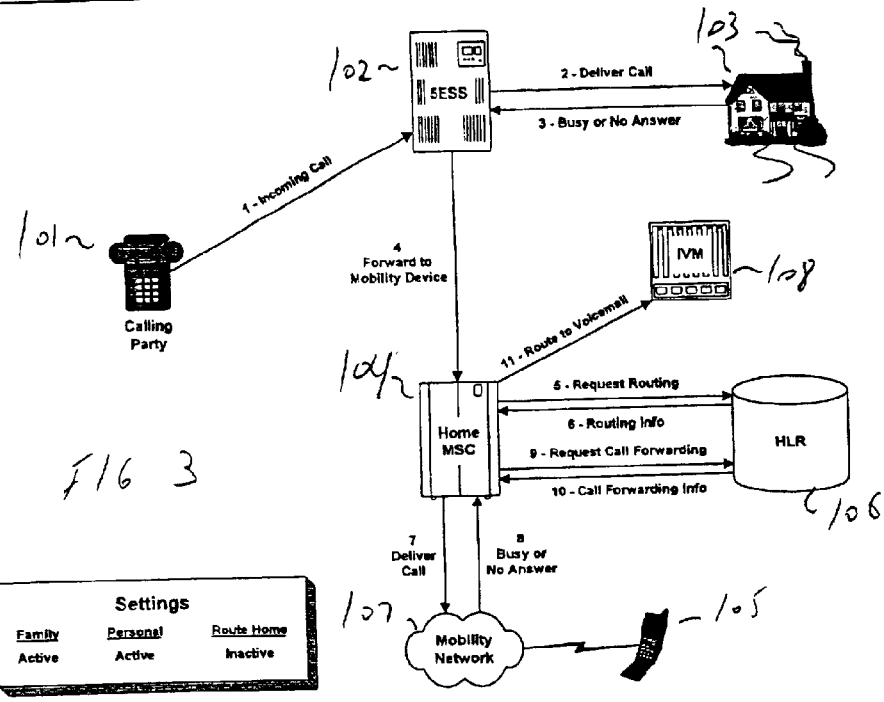
FIG. 3 shows a system handling an unanswered call to a residence in accordance with another embodiment of the present invention.

FIG. 3 shows the same system, except the family setting is active, the personal setting is also active, and the route-home setting is inactive. An incoming call for the subscriber's residence telephone is delivered to the Class 5 switch 102, which attempts to deliver the call to the residence telephone 103, and encounters a busy/no-answer condition. Since the family setting is active, the incoming call is forwarded to the MSC 104, which requests routing information from the HLR 106.

If the mobility device 105 is registered, then since the personal setting in the subscriber's HLR profile is active, then the HLR determines the routing information (e.g., the Temporary Line Directly Number ("TLDN") as known in the art), and returns it to the MSC 104. The MSC 104 uses this information to try and route the call over the mobility network 107 to the mobility device 105. If there is a busy/no-answer condition at the mobility device, then the mobility network 107 reports this condition back to the MSC 104. The MSC 104 then requests all forwarding information from the HLR 106, which instructs the MSC 104 to route the call to IVM 108, which it does.

If the mobility device is not registered when the incoming call is first forwarded to the MSC 104, or if the mobility device is known to be in a busy condition at this time, then the HLR 106 returns instructions to the MSC 104 to route the incoming call to IVM 108. The call is then routed to IVM 108.

Figure 4:
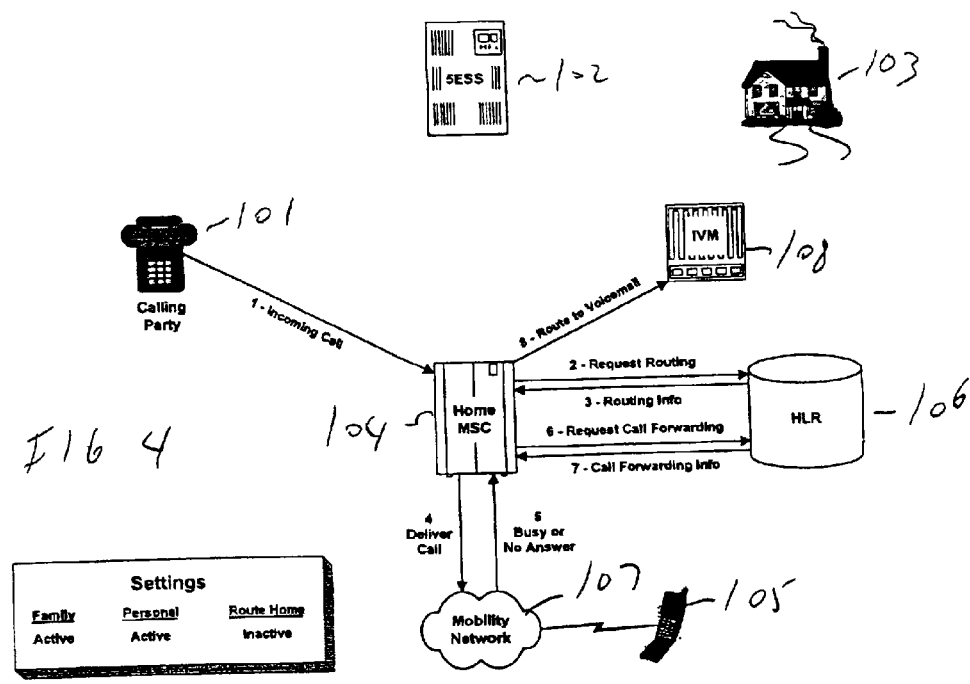
FIG. 4 shows a system handling an unanswered call to a mobility device in accordance with another embodiment of the present invention.

FIG. 4 shows a scenario where the family and personal settings are active, the route-home setting is inactive, and there is an incoming call to the mobility device. The incoming call is routed to the MSC 104 by the PSTN. The MSC 104 requests routing information from the HLR 106. If the mobility device is registered, and since the personal setting in the subscriber's HLR profile is active, the HLR 106 determines the routing information (e.g., the TLDN), and returns it to the MSC 104. Using the routing information received from the HLR 106, the MSC 104 attempts to deliver the incoming call over the mobility network 107 to the device 105. If a busy-no-answer condition exists at the device 105, then the mobility network reports this back to the MSC 104, which then requests call forwarding information from the HLR 106. The HLR 106 instructs the MSC 104 to forward the incoming call to IVM 108, which it does.

If the mobility device is not registered at the time the incoming call is first forwarded to the MSC 104, or the device is known to have a busy/no-answer condition at that time, then the HLR 106 returns instructions to route the incoming call to IVM 108, which is done.

FIG. 5 shows the same system handling an unanswered call to the subscriber's residence telephone 103, except the family and personal settings are inactive, and the route-home setting is active. The incoming all is delivered by the PSTN to the Class 5 switch 102, which attempts to deliver the call to the residence 103. A busy/no-answer condition is encountered at the residence telephone 103. Since the family setting is inactive, the incoming call is routed to the IVM 108.

FIG. 6 shows the system handling an unanswered call to the mobility device 105, where the family and personal settings are inactive, and the route-home setting is active. The incoming call is delivered by the PSTN to the MSC 104, which requests routing information from the HLR 106. Since the personal setting is inactive and the route-home setting is active, the HLR 106 returns instructions to the MSC 104 to route the incoming call to the DN of the subscriber's residential telephone 103. The Class 5 switch 102 attempts to deliver the call, but there is a busy/no-answer call at the resident's telephone 103, so the call is routed to IVM 108.

Figure 7:
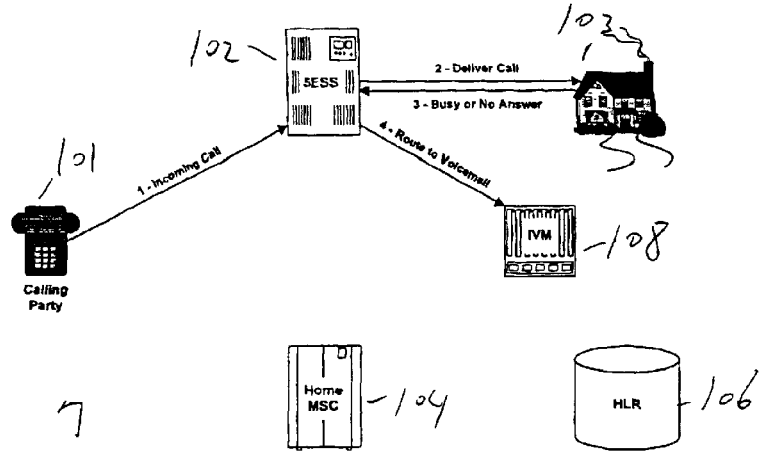
FIG. 7 shows a system handling an unanswered call to a residence in accordance with another embodiment of the present invention.

FIG. 7 shows a system handling an unanswered call to the residence telephone 103, where the personal and route-home settings are active, and the family setting is inactive. The incoming call to the residence 103 is delivered by the PSTN to the Class 5 switch 102, which attempts to deliver the message, but encounters a busy/no-answer condition. Since the family setting is inactive, the incoming call is routed to IVM 108.

Figure 8:
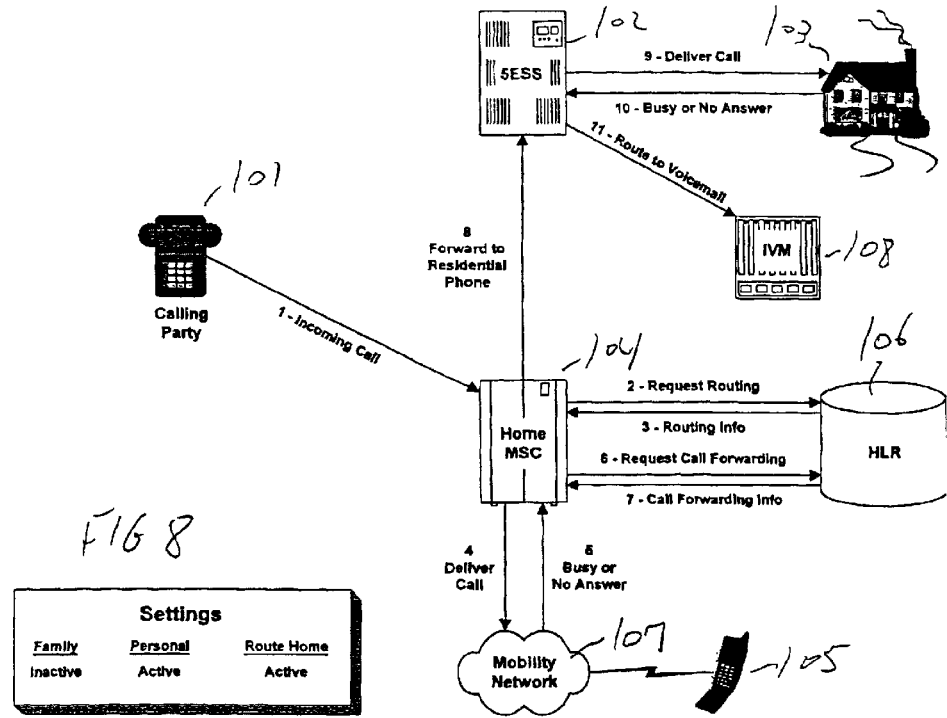
FIG. 8 shows a system handling an unanswered call to a mobility device in accordance with another embodiment of the present invention.

FIG. 8 shows a system handling an unanswered call to a mobility device 105, where the personal and route-home settings are active, and the family setting is inactive. The incoming call is delivered by the PSTN to the MSC 104, which requests call routing information from the HLR 106. If the mobility device is registered and since the personal setting in the subscriber's HLR profile is active, the HLR 106 determines the routing information (e.g., TLDN), and returns it to the MSC 104. Using the routing information from the HLR 106, the MSC 104 attempts to deliver the call over the mobility network 107 to the mobility device 105. A busy/no-answer condition is encountered at the device 105, which is reported by the mobility network 107 to the MSC 104. The MSC 104 then requests call forwarding information from the HLR 106. Since the route-home setting is active, the HLR returns instructions to the MSC 104 to route the incoming call to the DN of the subscriber's residential telephone 103. The Class 5 switch attempts to deliver the incoming call to the residential telephone 103, but encounters a busy/no-answer condition. The incoming call is then routed to IVM 108.

If the mobility device is not registered, or known to be in a busy/no-answer condition at the time the MSC first receives the incoming call, then the HLR returns instructions to route the call to the DN of the subscriber's residential telephone 103 (because the route-home setting is active), which is done by the MSC 104.

Figure 9:
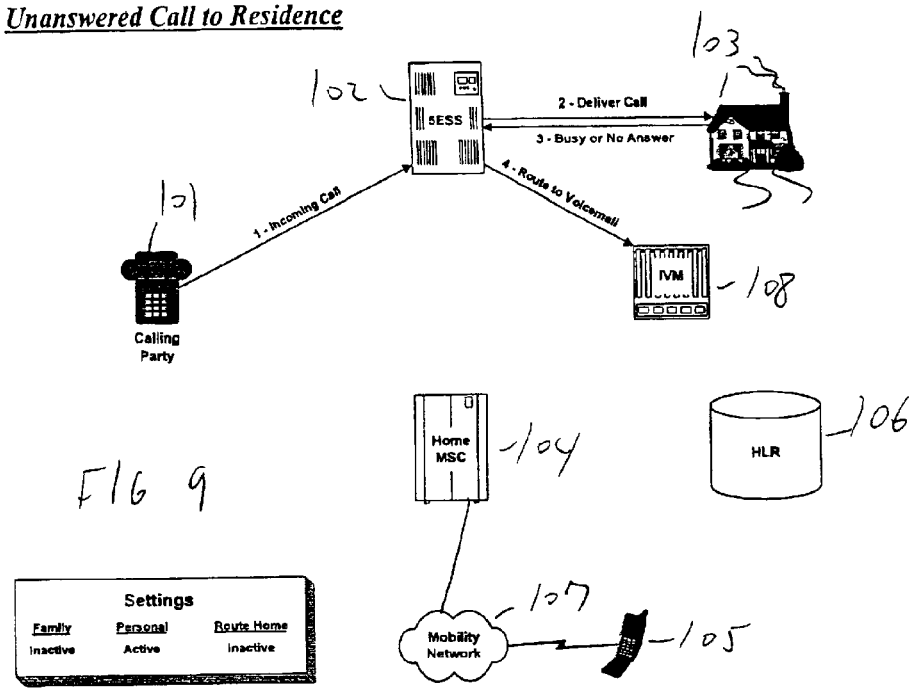
FIG. 9 shows a system handling an unanswered call to a residence in accordance with another embodiment of the present invention.

FIG. 9 shows a system handling an unanswered call to a residence telephone 103, where the personal setting is active, and the family and route-home settings are inactive. The incoming call is delivered by the PSTN to the Class 5 switch 102, which attempts to deliver the call to the residence 103. A busy/no-answer condition is detected at the residence 103, and since the family setting is inactive, the incoming call is routed to IVM 108.

Figure 10:
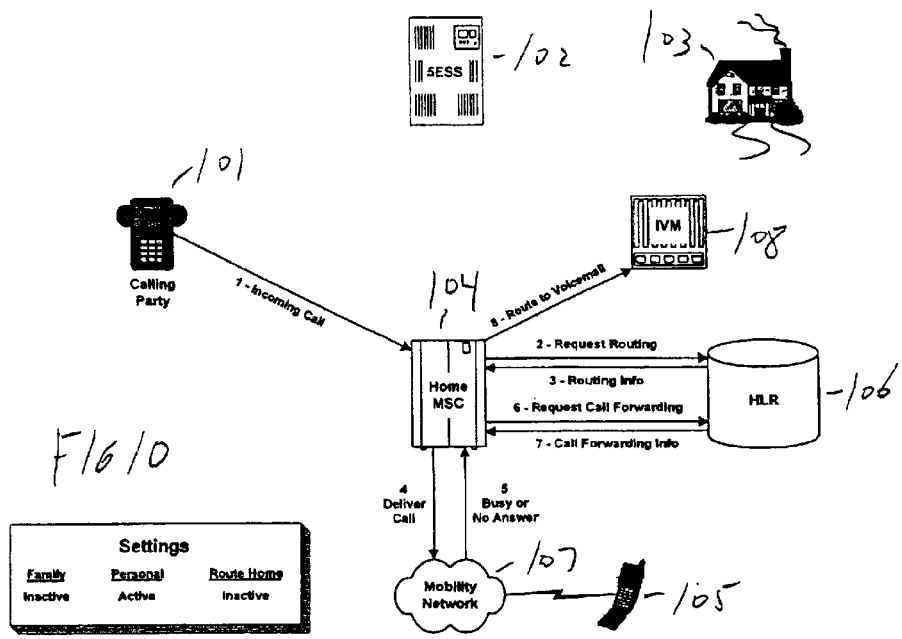
FIG. 10 shows a system handling an unanswered call to a mobility device in accordance with another embodiment of the present invention.

FIG. 10 shows a system handling an unanswered call to a mobility device 105, where the personal setting is active, and the family and route-home settings are inactive. The incoming call is delivered by the PSTN to the MSC 104, which requests call routing information from the HLR 106. If the mobility device 105 is registered, and since the personal setting in the subscriber's HLR profile is active, the HLR 106 determines the routing information (e.g., TLDN) and returns this routing information to the MSC 104. Using this routing information, the MSC 104 attempts to deliver the call to the device 105 over the mobility network 107. The mobility network detects a busy/no-answer condition at the device 105, and reports it back to the MSC 104. The MSC requests call forwarding information from the HLR, which returns instructions to forward the call to IVM 108, which the MSC 104 does.

If the mobility device 105 is not registered or already in a busy condition when the MSC 104 first receives the call from the PSTN, the HLR returns instructions to the MSC to forward the call to IVM 108, which is done.

In accordance with an embodiment of the present invention, the subscriber can update her settings (e.g., active or inactive for family, route-home, personal, etc.) using a web page interface over the Internet from a personal computer, a mobility device, an Internet appliance (e.g., a networked Personal Digital Assistant, etc.) The subscriber's settings are maintained in a subscriber profile in the HLR, and can be implemented partly by manipulating call forwarding information in a Class 5 switch associated with the subscriber's residential telephone DN.

Figure 11:
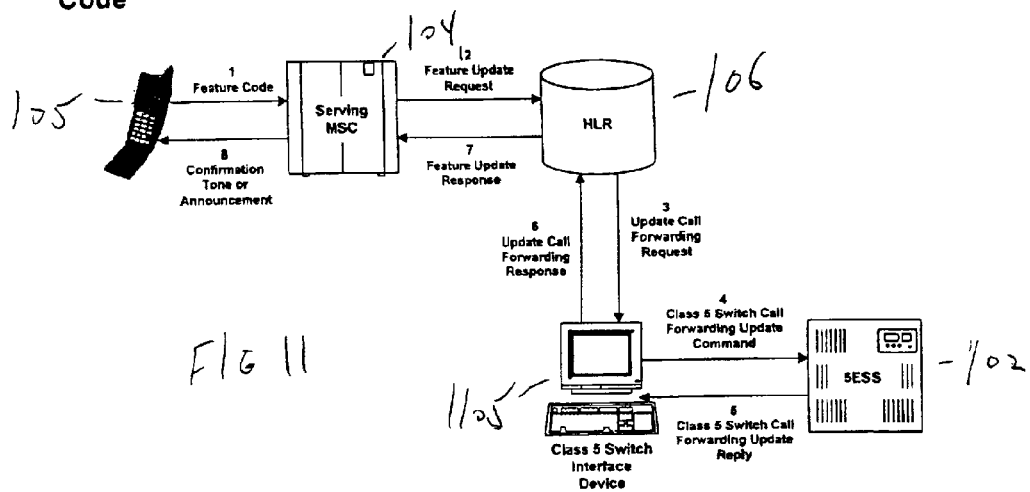
FIG. 11 shows a system for updating a setting from a mobility device in accordance with an embodiment of the present invention.

FIG. 11 shows an HLR 106 and Class 5 switch 102 update from a mobility device 105. The subscriber enters the feature code to change using an interface (e.g., touch pad) on her mobility device 105. The entered feature code is sent to a MSC 104, which forwards the change request to the HLR 106. The HLR 106 determines that the feature code is associated with a setting, and that call forwarding information on the Class 5 switch 102 needs to be updated. The HLR 106 sends an update call forwarding request to a Class 5 switch interface device 1105.

The Class 5 switch interface device 1105 is a command translator that receives a transaction request from a HLR (or another service control point), translates the command request into one or more appropriate Class 5 switch commands, sends these commands to a Class 5 switch, collects responses from the Class 5 switch, formats a transaction response, and sends the transaction response back to the requesting HLR 106 or other service control point. A single Class 5 switch interface device 1105 can advantageously support multiple Class 5 switches, HLRs and service control points. The Class 5 switch interface device 1105 can support an interface method that sends commands via the Recent Change maintenance ports on the Class 5 switch; and can also support an interface method that uses Remote Call Forwarding with call setup and feature codes. The Class 5 switch interface device 1105 can, if necessary, maintain a mapping of residential DNs to the associated Class 5 switch 102.

Once the update call is received by the Class 5 switch interface device 1105, it sends the appropriate commands to update the associated call forwarding number to the Class 5 switch 102. The Class 5 switch updates the call forwarding number, and sends a reply to the Class 5 switch interface device 1105, which in turn sends the update call forwarding response back to the HLR 106. The HLR 106 updates the settings in the subscriber's HLR profile, and sends a feature response back to the MSC 104. The MSC 104 sends a confirmation (e.g., plays confirmation tones, plays an announcement, etc.) to the subscriber 105.

Figure 12:
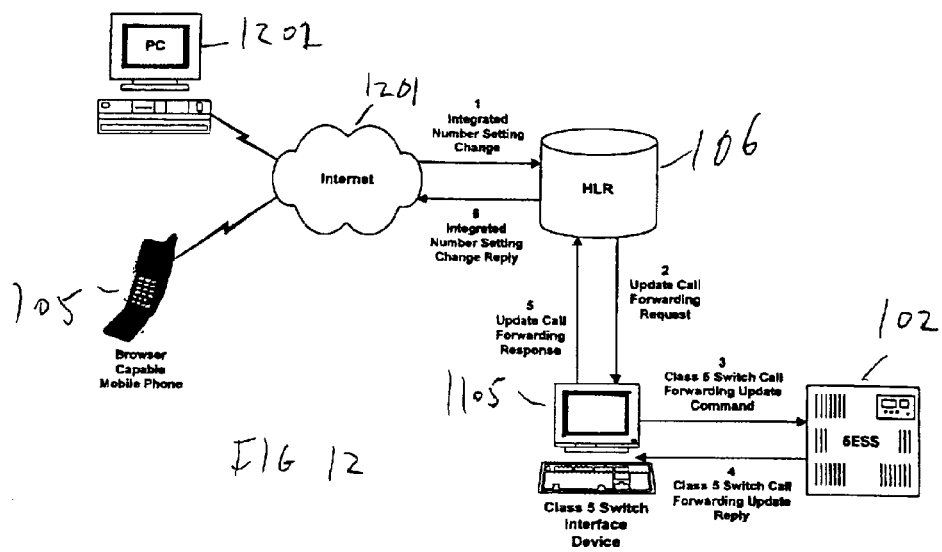
FIG. 12 shows a system for updating a setting using a web browser interface in accordance with an embodiment of the present invention.

FIG. 12 shows an system that updates an HLR 106 and Class 5 switch 102 from a web browser interface 1202. A subscriber enters a setting change (e.g., "activate family setting") over the Internet 1201 from a PC 1202 executing a browser. The HLR 106 determines that the setting change requires an update to the call forwarding on the associated Class 5 switch 102. The HLR 106 sends an update call forwarding request to the Class 5 switch interface device 1105, which sends the appropriate commands to update the associated call forwarding information to the right Class 5 switch 102. The Class 5 switch 102 updates the call forwarding number and sends a response back to the interface device 11105, which sends an update call forwarding response back to the HLR 106. The HLR 106 updates the settings in the subscriber's HLR profile, and sends a setting change reply back over the Internet 1201 to the PC 1202, where a confirmation of the change (or an error message) is displayed to the subscriber.

Figure 13:
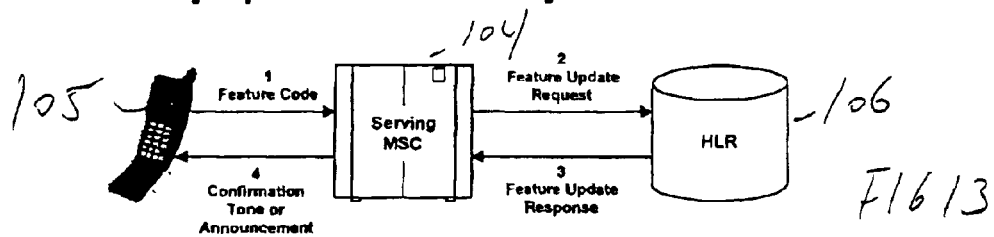
FIG. 13 shows a system for updating a setting from a mobility device in accordance with another embodiment of the present invention.

FIG. 13 shows an update only to the HLR 106 from a mobility device 105. The subscriber enters the feature code to change a setting (e.g., "deactivate route-home") on her mobility device. The feature code is sent to the MSC 104, which sends it to the HLR 106, which in turn updates the settings in the subscriber's HLR profile. The HLR 106 determines that no change is needed in call forwarding information on any Class 5 switch. The HLR sends a feature update response back to the MSC 104, which plays a confirmation to the subscriber through the mobility device 105.

Figure 14:
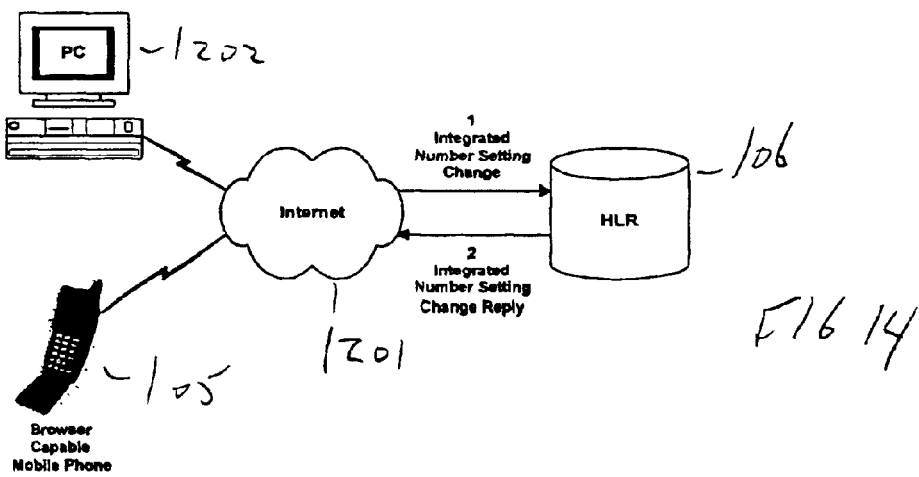
FIG. 14 shows a system for updating a setting using a web browser interface in accordance with another embodiment of the present invention.

FIG. 14 shows an update of only the HLR 106 from a web browser interface. The subscriber enters a setting change over the Internet from her PC (or from her web-browser-capable mobile telephone), which is received by the HLR 106. The HLR 106 determines that no update is required on the associated Class 5 switch (not shown), and updates the HLR profile of the subscriber. The HLR 106 sends a setting change reply back over the Internet 1201 to the PC 1202, where it is displayed to the subscriber.

The present invention encompasses other embodiments that provide settings in addition to those described above (residential, personal and route-home.) In one embodiment, a work setting is provided that, when activated, cause incoming calls to a subscriber's office that encounter a busy/no-answer condition to be forwarded to the subscriber's mobility device. If a busy/no-answer condition is then encountered at the mobility device, then the call is routed to the office voice mail system. When the work setting is inactive, calls to the subscriber's office DN that encounter a busy/no-answer condition are forwarded to the office voice mail system.

Another embodiment provides a road setting that, when active, routes an incoming call to the subscriber's office DN directly to the subscriber's mobility device, without having to be presented first to the subscriber's office telephone. If a busy/no-answer condition is encountered at the subscriber's mobility device, the call is routed to the office voice mail system. When the road setting is inactive, calls to the subscriber's office DN are presented to the subscriber's office telephone. If the call encounters a busy/no-answer condition, the routing of the call can be dependent upon the current value of the work setting.

The "filters" implemented in accordance with the present invention can be richer than merely indicating a number or voice mail service to which to forward a call. For example, the subscriber can specify that a call from a particular source (by telephone number, caller name, area code, etc.) be forwarded to a first DN or service, while all other calls be forwarded to another. A subscriber can specify that calls that arrive during a particular time of day (e.g., during business hours) at a first number be forwarded to a second number (e.g., an office DN), while calls that arrive at the first number at a different time of day (e.g., outside of business hours) be forwarded to a third number (e.g., a residential DN). Likewise, a subscribe can specify the urgency of calls that arrive at or from a particular DN. Similarly, a subscriber can have her call forwarding configuration change automatically based upon her physical location. Any other suitable parameter (e.g., day of week, time of year, weather conditions, etc.) can be used to condition call forwarding instructions.

In one embodiment, the present invention includes a medium storing instructions adapted to be executed by a processor to perform the method in accordance with an embodiment of the present invention. A medium is any device adapted to store digital information, such as Random Access Memory, Read Only Memory, flash memory, a Compact Disk Read Only Memory (CD-ROM), a hard disk, etc. Examples of a processor include a general purpose microprocessor, such as the Pentium III microprocessor manufactured by the Intel Corporation of Santa Clara, Calif., and an Application Specific Integrated Circuit (ASIC.) An ASIC embodies at least part of the method in accordance with an embodiment of the present invention in its hardware and/or firmware. An example of an ASIC is a digital signal processor. The medium stores software (instructions) that, when executed by the processor, practice an embodiment of the present invention.

In accordance with an embodiment of the present invention, the fixed-site switch (e.g., the Class 5 Switch)

includes a processor coupled to a memory. The memory stores instructions adapted to be executed by the processor to perform the method in accordance with an embodiment of the present invention. Likewise, the Mobile Switching Center includes a processor coupled to a memory. The memory stores instructions (software) adapted to be executed by the processor to perform the method in accordance with an embodiment of the present invention. Similarly, a separate entity can store a subscriber profile (settings), receive a request for routing information (e.g., including the subscriber identifier, the calling party Directory Number, the subscriber Directory Number to which the calling party directed the call, etc.), consult the stored subscriber profile, formulate routing information based upon the profile, and then send the information to the requester. An example of such a device is a Home Location Register. The HLR performs these functions using a processor coupled to a memory. The memory stores the instructions (software) adapted to be executed by the processor to perform the method described above, and can store the subscriber profile.

The embodiments disclosed herein are meant to illustrate, and not limit, the scope of the present invention. The present invention encompasses other embodiments as would be apparent to those of ordinary skill in the art, based upon the description set forth herein.

What is claimed is:

1. A method for forwarding an incoming call addressed to one of a plurality of Directory Numbers belonging to a subscriber, including:

receiving an incoming call at one of a number corresponding to a fixed-site device or a number corresponding to a mobility device belonging to the subscriber, wherein a call to the number corresponding to the fixed-site device is received via a switch of the Public Switched Telephone Network that communicates with a Mobile Service Center (MSC) coupled to a mobility network, and a call to the number corresponding to the mobility device is received via the MSC, the MSC being further coupled to a Home Location Register (HLR) having a database including a plurality of values for subscriber call forward settings to determine an action to be taken in the event of a busy/no answer condition for either the fixed-site device or the mobility device;

determining that a busy/no answer condition exists for the device corresponding to the number at which the incoming call is received;

consulting the call forward settings of the HLR; and based on the call forward settings, performing one of routing the incoming call to the fixed-site device, to the mobility device, or to voice mail.

2. The method of claim 1, wherein the switch is a Class 5 Switch.

3. A medium storing instructions adapted to be executed by a processor to perform steps including:

receiving an incoming call directed to one of a number corresponding to a fixed-site device or a number corresponding to a mobility device belonging to the subscriber, wherein a call to the number corresponding to the fixed-site device is received via a switch of the Public Switched Telephone Network that communicates with a Mobile Service Center (MSC) coupled to a mobility network, and a call to the number corresponding to the mobility device is received via the MSC, the MSC being further coupled to a Home Location Register (HLR) having a database including a plurality of values for subscriber call forward settings to determine an action to be taken in the event of a busy/no answer condition for either the fixed-site device or the mobility device;

determining that a busy/no answer condition exists for the device corresponding to the number at which the incoming call is received;

consulting the call forwarding settings of the HLR; and based on the call forwarding settings, performing one of routing the incoming call to the fixed-site device, to the mobility device, or to voice mail.

4. The medium of claim 3, wherein the switch is a Class 5 Switch.

5. An apparatus for forwarding an incoming call to one of a plurality of Directory Numbers belonging to a subscriber, including:

a processor;

a memory coupled to said processor, said memory storing instructions adapted to be executed by said processor to:

receive an incoming call at one of a number corresponding to a fixed-site device or a number corresponding to a mobility device belonging to the subscriber, wherein a call to the number corresponding to the fixed-site device is received via a switch of the Public Switched Telephone Network that communicates with a Mobile Service Center (MSC) coupled to a mobility network, and a call to the number corresponding to the mobility device is received via the MSC, the MSC being further coupled to a Home Location Register (HLR) having a database including a plurality of values for subscriber call forward settings to determine an action to be taken in the event of a busy/no answer condition for either the fixed-site device or the mobility device;

determine that a busy/no answer condition exists for the device corresponding to the number at which the incoming call is received;

consult the call forwarding settings of the HLR; and based on the call forwarding settings, perform one of routing the incoming call to the fixed-site device, to the mobility device, or to voice mail.

* * * * *